O. Redmond.
Harvester-Rake.
No. 75297. Patented Mar. 10, 1868
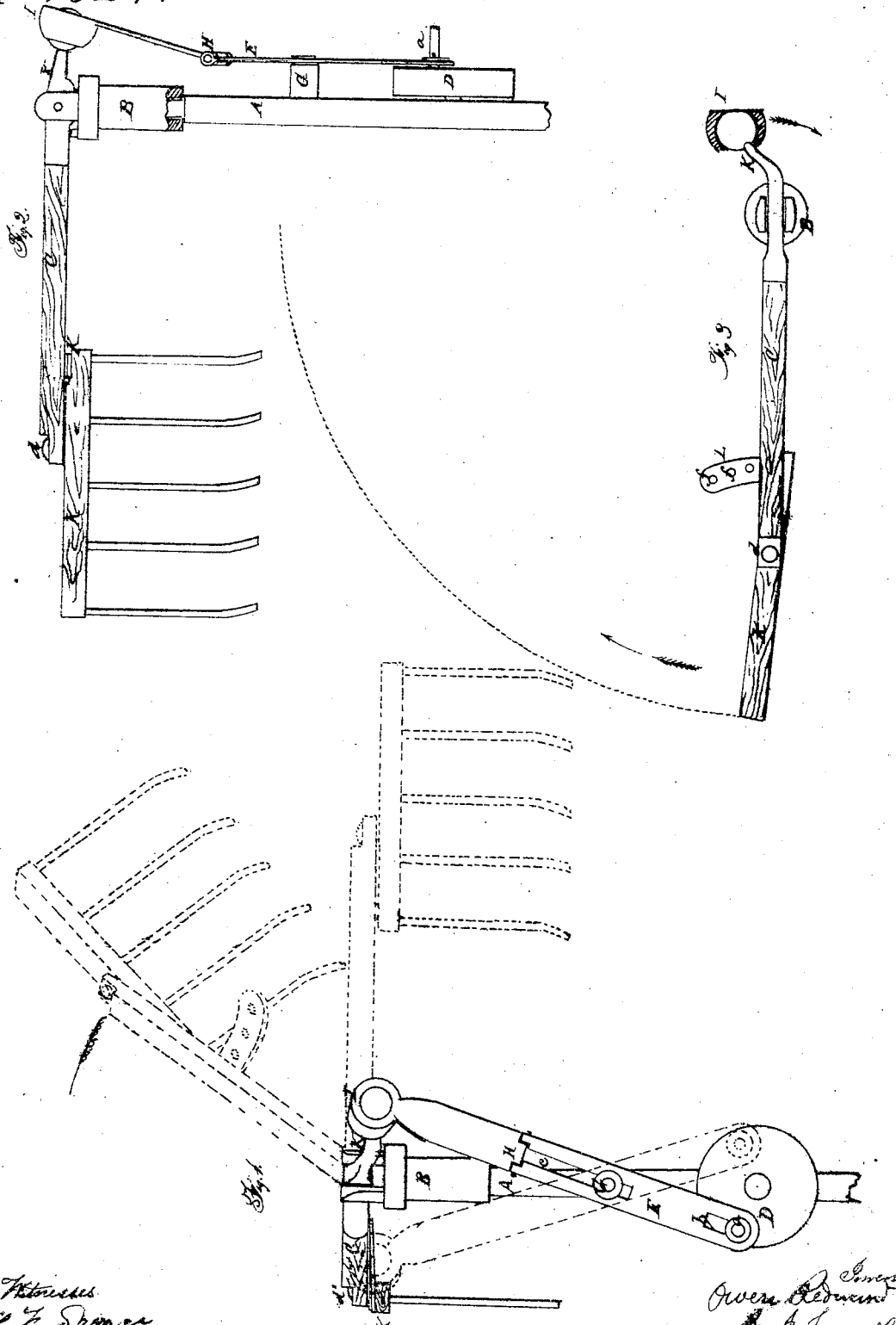

United States Patent Office.

OWEN REDMOND, OF ROCHESTER, NEW YORK.

Letters Patent No. 75,297, dated March 10, 1868.

IMPROVEMENT IN HARVESTER-RAKES.

*The Schedule referred to in these Letters Patent and making part of the same.*

TO ALL WHOM IT MAY CONCERN:

Be it known that I, OWEN REDMOND, of Rochester, in the county of Monroe, and State of New York, have invented a certain new and useful Improvement in Rakes for Harvesters; and I do hereby declare that the following is a full and exact description thereof, reference being had to the accompanying drawings, making part of this specification.

Figure 1 is an elevation of my improved rake.

Figure 2, an elevation at right angles to fig. 1.

Figure 3, a plan of the rake, with the ball-and-socket joint in section.

Like letters of reference indicate corresponding parts in all the figures.

My invention consists in producing the several movements of an automatic sweep-rake, by the action of a simple crank, through the medium of a rock-lever, jointed in such a manner as to allow the necessary flexions.

As represented in the drawings, A is a standard, which is secured to the harvester in the desired position. This standard is provided with a swivel-jointed top, B, having pivoted thereto the rake-shaft C, so as to turn both horizontally and vertically. To the bottom of the standard is secured a crank, D, which is operated in any desired manner. The crank-pin $a$ of this crank rests in a slot, $b$, of a rock-lever, E, which thus constitutes the pitman. At a suitable position above, another slot, $c$, of the lever rests over a fixed fulcrum, G, of the standard. Above this, the rock-lever is provided with a stiff hinge-joint, H, and at the top it connects with the short arm $k$ of the rake-shaft, by means of a ball-and-socket joint, I, or equivalent, which allows a universal motion.

By this simple connection of the rake with the crank, through the medium of the jointed rock-lever, as described, all the necessary automatic movements of a sweep-rake are produced. As shown by black lines in fig. 1, the rake is at the position of commencing its sweep. The crank-pin, in going forward, throws the lever from the position shown in black to that shown in dotted lines, the lever moving around the fulcrum G. This throw of the lever gives the necessary sweep of the rake. When this sweep of the rake is accomplished, as in dotted lines, the crank commences to go down, and consequently the rake begins to rise. The rising of the rake from the platform free from the grain is accomplished quickly and without back action, for the reason that the crank, at the end of the sweep, is in that position relatively to the dead-point where the movement is nearly vertical. From this time the rake is carried around in an elevated position, as is described by the red lines, fig. 1, till the crank reaches its first position again, where it strikes down once more upon the front end of the platform.

I am aware of no other device in which the automatic movements of the rake are produced by the simple action of a crank and rock-lever. To effect these movements, the peculiar arrangement of the joints, as above described, is necessary. The stiff hinge-joint H secures the necessary stiffness laterally, while at the same time its flexion outward allows the sweep of the short arm of the rake-shaft in the arc of a circle. The universal joint I, at the top, allows the combined horizontal and vertical swinging of the rake. The slot $b$ is of much importance, since it allows the free movement or play of the crank-pin resting therein, to such an extent as to retain the rake in a horizontal position during its sweep over the platform. Were the crank-pin jointed fast to the end of the rock-lever, the rake would be inoperative, as it would be depressed in passing over the platform. The rake-head K is pivoted at $d$ to the shaft, and at its inner end it has a gauge-plate, L, provided with adjusting-holes $ff$, by which the angle of the rake may be set as desired.

What I claim as my invention, and desire to secure by Letters Patent, is—

Producing the automatic movements of a sweep-rake for harvesters, by the employment of a crank, D, and a rock-lever, E, jointed as described, the whole operating in the manner and for the purpose herein set forth.

In witness whereof, I have hereunto signed my name in the presence of two subscribing witnesses.

OWEN REDMOND.

Witnesses:
 R. F. OSGOOD,
 CHAS. F. SPENCER.